(12) United States Patent
Aliseychik et al.

(10) Patent No.: US 8,539,009 B2
(45) Date of Patent: Sep. 17, 2013

(54) PARALLEL TRUE RANDOM NUMBER GENERATOR ARCHITECTURE

(75) Inventors: Pavel A. Aliseychik, Moscow (RU); Elyar E. Gasanov, Moscow (RU); Oleg N. Izyumin, Los Gotos, CA (US); Ilya V. Neznanov, Moscow (RU); Pavel A. Panteleev, Moscow (RU)

(73) Assignee: LSI Corporation, San Jose, CA (US)

(\*) Notice: Subject to any disclaimer, the term of this patent is extended or adjusted under 35 U.S.C. 154(b) by 1309 days.

(21) Appl. No.: 12/335,870

(22) Filed: Dec. 16, 2008

(65) Prior Publication Data

US 2010/0153478 A1     Jun. 17, 2010

(51) Int. Cl.
*G06F 15/16* (2006.01)
*G06F 17/30* (2006.01)
*G06F 7/58* (2006.01)

(52) U.S. Cl.
USPC ............................... 707/899; 708/255; 726/9

(58) Field of Classification Search
USPC .............................. 708/255; 707/899; 726/9
See application file for complete search history.

(56) References Cited

U.S. PATENT DOCUMENTS

| | | | | |
|---|---|---|---|---|
| 6,871,206 B2 * | 3/2005 | Henry et al. | ................... | 708/250 |
| 7,047,262 B2 * | 5/2006 | Hars | ............................ | 708/255 |
| 7,219,112 B2 * | 5/2007 | Henry et al. | ................... | 708/250 |
| 7,496,616 B2 * | 2/2009 | Chari et al. | .................... | 708/250 |
| 8,010,587 B2 * | 8/2011 | Kumar et al. | .................. | 708/250 |
| 2004/0019619 A1 * | 1/2004 | Buer et al. | ..................... | 708/254 |
| 2004/0264233 A1 * | 12/2004 | Fukushima et al. | .......... | 365/145 |
| 2009/0067618 A1 * | 3/2009 | Kumar et al. | ................... | 380/28 |
| 2010/0306296 A1 * | 12/2010 | Inglett et al. | .................. | 708/255 |

OTHER PUBLICATIONS

Federal Information Processing Standards Publication 197, "Announcing the Advanced Encryption Standard (AES)", Nov. 26, 2001, pp. 1-51.
"A Provably Secure True Random Number Generator with Built-In Tolerance to Active Attacks", IEEE Transactions on Computers, vol. 56, No. 1, Jan. 2007, pp. 109-119.
IEEE 802.11i-2004. Amendment to IEEE Std. 802.11, 1999 Edition (Reaff 2003). IEEE Standard for Information technology—Telecommunications and information exchange between system—Local and metropolitan area networks—Specific requirements—Part 11: Wireless LAN Medium Access Control (MAC) and Physical Layer (PHY) specifications—Amendment 6: Medium Access Control (MAC) Security Enhancements, Jul. 23, 2004, pp. 1-175.
Security Requirements for Cryptographic Modules, FIPS PUB 140-2, NIST (2001), http://csrc.nist.gov/publications/fips/fips140-2/fips1402.pdf, May 25, 2001, pp. 1-61.
NIST 800-90 (Jun. 2006), "Recommendation for Random Number Generation Using Deterministic Random Bit Generators", Mar. 2007, pp. 1-124.

\* cited by examiner

*Primary Examiner* — Jorge A Casanova
(74) *Attorney, Agent, or Firm* — Christopher P. Maiorana, PC (57) ABSTRACT

A system having an entropy module, a memory module and a main module is disclosed. The entropy module may be configured to generate a plurality of first random numbers. The memory module may be configured to buffer (i) the first random numbers and (ii) a plurality of second random numbers. The main module is generally configured to (i) control a first transfer of the first random numbers from the entropy module to the memory module, (ii) control a second transfer of the first random numbers from the memory module to the main module, (iii) generate the second random numbers by encrypting the first random numbers and (iv) control a third transfer of the second random numbers from the main module to the memory module. The generation of the first random numbers and the generation of the second random numbers may be performed in parallel.

21 Claims, 6 Drawing Sheets

TABLE I

| REGISTER NAME | READ/ WRITE | SHORT DESCRIPTION |
|---|---|---|
| RESEED | W | RESEED COMMAND: MAY BE SENT TO INITIALIZE THE TRNG BEFORE GENERATING ANY RANDOM NUMBERS. MAY BE SENT AT ANY MOMENT LATER. MAY BE SENT AFTER THE SEED LIFETIME IS EXPIRED ($2^{48}$ BITS MAY BE READ FROM R_OUT) |
| POWER_OFF | R/W | WRITING ANY VALUE TO REGISTER MAY SET THE TRNG TO A POWER OFF MODE. READ/WRITE TO ANY OTHER REGISTER MAY END THE POWER OFF MODE. |
| BIST | W | COMMAND TO START A DETERMINISTIC SELF-TEST. A RESEED SHOULD BE PERFORMED AFTER COMPLETION. |
| RST | W | SOFT RESET: RESTORES THE TRNG INITIAL STATE (JUST AFTER THE HRESETn POSITIVE EDGE). A RESEED SHOULD BE PERFORMED AFTER COMPLETION. |
| R_STATUS | R | DESCRIBES THE TRNG STATE (COMMAND BEING EXECUTED, THE NUMBER OF GENERATED BITS AVAILABLE IN THE FIFO, ETC...) |
| R_OUT | R | REGISTER TO READ THE GENERATED RANDOM NUMBERS. |
| FIPS_OUT | R | CONTAINS THE RESULTS OF THE FIPS TESTS. |
| BIST_SIG | R | CONTAINS THE RESULTS OF THE LAST BIST. |
| RING_STAT | R | CONTAINS THE RESULT OF THE LAST RING OSCILLATOR TEST. |
| SEED | W | WRITING TO THIS REGISTER PUTS THE ADDITIONAL SEED MATERIAL. |
| RING_DATA | R | CONTAINS THE OUTPUT OF THE RING OSCILLATOR POOL. |

PARALLEL TRUE RANDOM NUMBER GENERATOR ARCHITECTURE

FIELD OF THE INVENTION

The present invention relates to cryptographic systems generally and, more particularly, to a method and/or apparatus for implementing a parallel true random number generator architecture.

BACKGROUND OF THE INVENTION

A True Random Number Generator (TRNG) makes random numbers for use in cryptographic applications, such as key generation. A strength of a cipher system is determined by the strength of the key that is, in turn, driven by a key length (i.e., number of bits) and a randomness of the number that generates the key. In an optimal situation, the random numbers are based on true physical sources of randomness that cannot be predicted. Ring oscillators with variable frequencies in time are commonly used as a source of true randomness. The main criterion in the TRNG is that the pool of numbers is unpredictable for any external observer. TRNG functions based on computer process identifications, parent process identifications, time and other predictable processes are considered weak.

SUMMARY OF THE INVENTION

The present invention concerns a system having an entropy module, a memory module and a main module. The entropy module may be configured to generate a plurality of first random numbers. The memory module may be configured to buffer (i) the first random numbers and (ii) a plurality of second random numbers. The main module is generally configured to (i) control a first transfer of the first random numbers from the entropy module to the memory module, (ii) control a second transfer of the first random numbers from the memory module to the main module, (iii) generate the second random numbers by encrypting the first random numbers and (iv) control a third transfer of the second random numbers from the main module to the memory module. The generation of the first random numbers and the generation of the second random numbers may be performed in parallel.

The objects, features and advantages of the present invention include providing a method and/or apparatus for implementing a parallel true random number generator architecture that may (i) control sharing of specific resources, (ii) provide an NIST Special Publication 800-90 compliant deterministic random bit generator mechanism, (iii) provide an Advanced Encryption Standard AES-256 cipher and/or (iv) perform several operations in parallel.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Attention is usually given to a True Random Number Generator (TRNG) TRNG function in secure systems because, if designed poorly the TRNG function generally becomes a weak point of the system. Some embodiments of the present invention may implement a National Institute of Standards and Technology (NIST) Special Publication 800-90, "Recommendation for Random Number Generation Using Deterministic Random Bit Generators", Gaithersburg, Md., March 2007, hereby incorporated by reference in its entirety. The TRNG module described below may be compliant with a Deterministic Random Bit Generators (DRBG) mechanism using an Advanced Encryption Standard (AES) AES-256 CTR_DRGB technique. The AES may be defined by the Federal Information Processing Standards (FIPS) Publication 197, "Advanced Encryption Standard (AES)", NIST, Gaithersburg, Md., Nov. 26, 2001, hereby incorporated by reference in its entirety. Per the AES-256 CTR_DRGB technique, a pool of several (e.g., 32) ring oscillators may be used as entropy sources. Additional entropy may be added to the pool via a register interface. Using the pool as a seed pool, a cipher (e.g., the AES-256 cipher) is generally used to create a stream of random bits loaded into an output First-In-First-Out (FIFO) module. The random bits in the FIFO module may be read through a register interface. Self-test operations should be performed before any data is read, and may be performed at any time.

Figure 1:
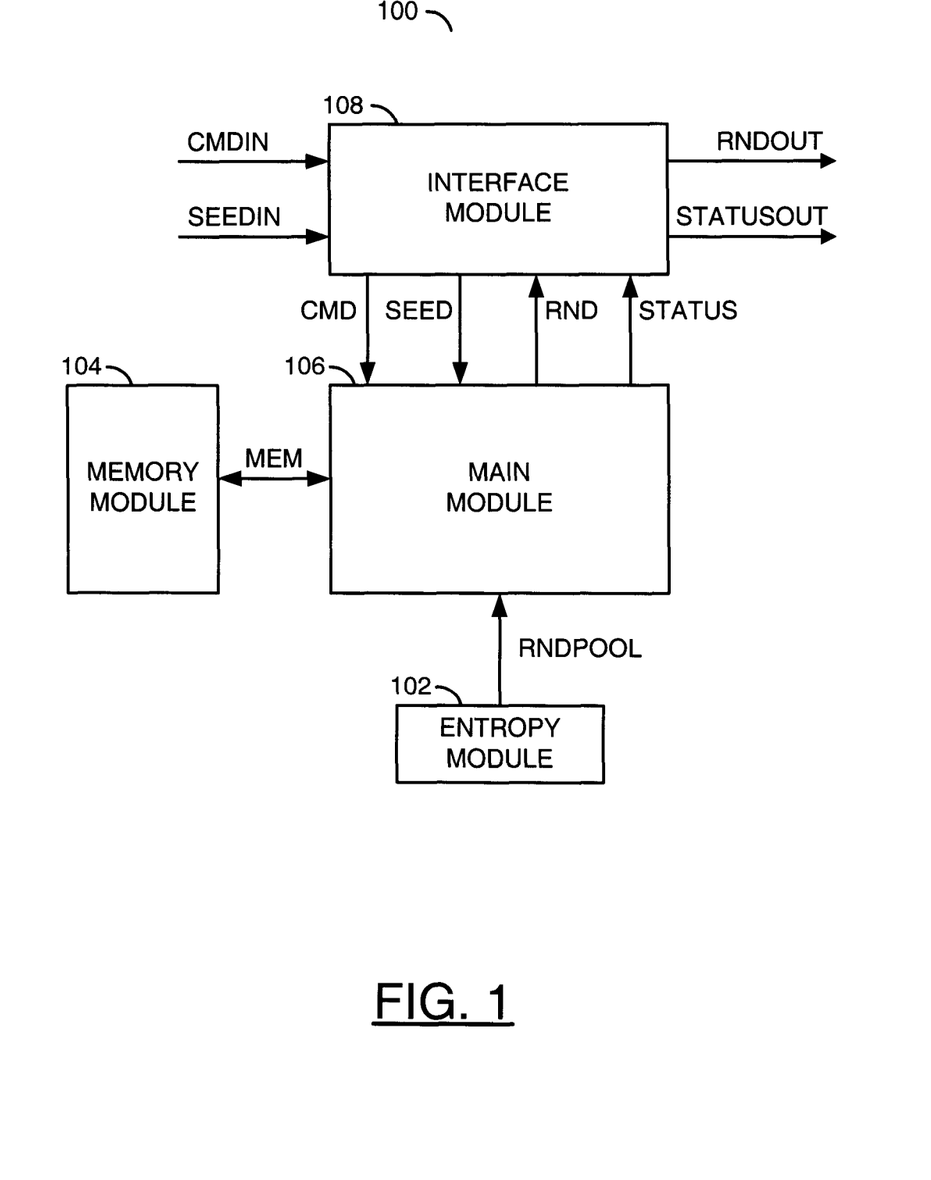
FIG. 1 is a block diagram of a system in accordance with a preferred embodiment of the present invention.

Referring to FIG. 1, a block diagram of a system 100 is shown in accordance with a preferred embodiment of the present invention. The system 100 generally comprises a module 102, a module 104, a module 106 and a module 108. A signal (e.g., CMDIN) may be received by the module 108. The module 108 may receive a signal (e.g., SEEDIN). A signal (e.g., RNDOUT) may be generated and presented by the module 108. A signal (e.g., CMD) may be generated by the module 108 and presented to the module 106. Another signal (e.g., SEED) may be generated by the module 108 and presented to the module 106. The module 106 may generate a signal (e.g., RND) that is presented to the module 108. A signal (e.g., MEM) may be exchanged between the module 106 and the module 104. The module 102 may generate a signal (e.g., RNDPOOL) received by the module 106. A signal (e.g., STATUS) may be generated by the module 106 and presented to the module 108. The module 108 may generate and present a signal (e.g., STATUSOUT). The modules 102 to 108 may represent circuits and/or blocks that may be implemented as hardware, software, a combination of hardware and software, or other implementations.

The module 102 may be implemented as an entropy source. The module 102 is generally operational to create multiple sequences of random numbers in parallel. The random numbers may be presented to the module 106 in the signal RNDPOOL. The module 102 generally comprises multiple (e.g., 32) ring oscillators, each generating an independent sequence of random numbers simultaneously. The module 102 may include a sleep control operation.

The module 104 may be implemented as a memory module. The module 104 may be operational to buffer (i) the raw random numbers generated by the module 102, (ii) modified random numbers generated by the module 106, (iii) internal states controlled by the module 106, (iv) seed data presented by the module 106 and (v) test results created by the module 106. Additional data may be stored in the module 104 to meet the criteria of a particular application.

The module 106 may be implemented as a main processing module. The module 106 is generally operational to (i) control a transfer of the raw random numbers from the module 102 to the module 104, (ii) control a transfer of the raw random numbers from the module 104 to the module 106, (iii) generate the modified random numbers by encrypting the raw random numbers, (iv) control a transfer of the modified random numbers from the module 106 to the module 102, (v) control a transfer of final random numbers from the module 104 to the module 108, (vi) write data received in the signal CMD and the signal SEED into registers (see FIG. 5) and (vii) present data from the registers in the signal STATUS. The raw random numbers may be received from the module 102 via the signal RNDPOOL. The random numbers may be exchanged with the module 104 via the signal MEM. The final random numbers may be transferred to the module 108 via the signal RND. The module 106 may be further operational to (i) evaluate a read request or a write request from a requesting module to perform a particular transfer, (ii) transfer data from a read address to the requesting module or from the requesting module to the write address in response to an acceptance of the request and (iii) ignore the requesting module in response to a rejection of the request.

The module 108 generally implements an interface module. The module 108 may be operational to transfer commands received in the signal CMDIN and seed information received in the signal SEEDIN to the module 106 via the signal CMD and the signal SEED, respectively. Data received in the signal STATUS may be transferred by the module 108 into the signal STATUSOUT. The module 108 may also be operational to present the final random numbers in the signal RNDOUT as received from the module 106 in the signal RND.

Figure 2:
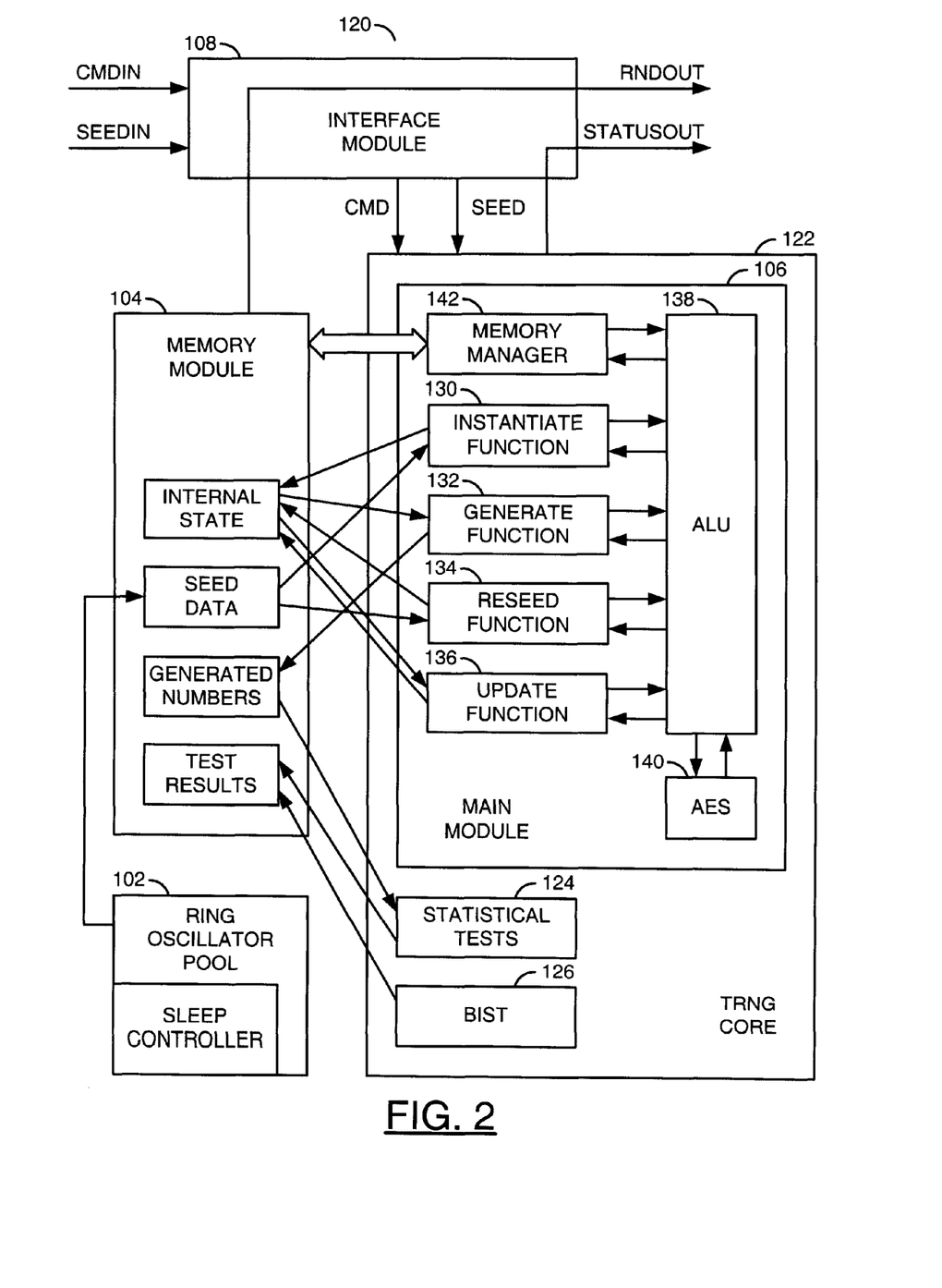
FIG. 2 is a functional block diagram illustrating an example architectural overview of the system.

Referring to FIG. 2, a functional block diagram illustrating an example architectural overview 120 of the system 100 is shown. The overview 120 generally comprises the module 102, the module 104, the module 108 and a module 122. The module 122 generally implements a TRNG core. The module 122 may be operational to (i) generate true random numbers and (ii) control access to resources in the system 100.

The module 122 generally comprises the module 106, a module 124 and a module 128. The module 124 may be implemented as a statistical test module. The module 124 is generally operational to verify that the random numbers created by the system are truly random. The module 126 may be implemented as a Built-In Self Test (BIST) module. The module 126 may be operational to test the overall health of the system 100.

The module 106 generally comprises a module 130, a module 132, a module 134, a module 136, a module 138, a module 140 and a module 142. The module 130 may implement an instantiation function. The module 132 may implement a generate function. The module 134 may implement a reseed function. The module 136 may implement an update function. The module 138 may implement an Arithmetic Logic Unit (ALU) module. The module 140 may implement an AES cipher module. The module 142 may implement a manager module. The modules 122 to 142 may represent circuits and/or blocks that may be implemented as hardware, software, a combination of hardware and software, or other implementations.

Additional details regarding the modules 124, 130, 132 and 134 may be found in the NIST Special Publication 800-90.

The module 136 may be operational to change the internal state of the system 100 as stored in the module 104. The internal state may be used as input to the module 132. In some embodiment, the module 138 may be implemented as a common ALU. Additional details of the module 140 may be found in the FIPS Publication 197. The module 142 is generally described in detail below.

Figure 3:
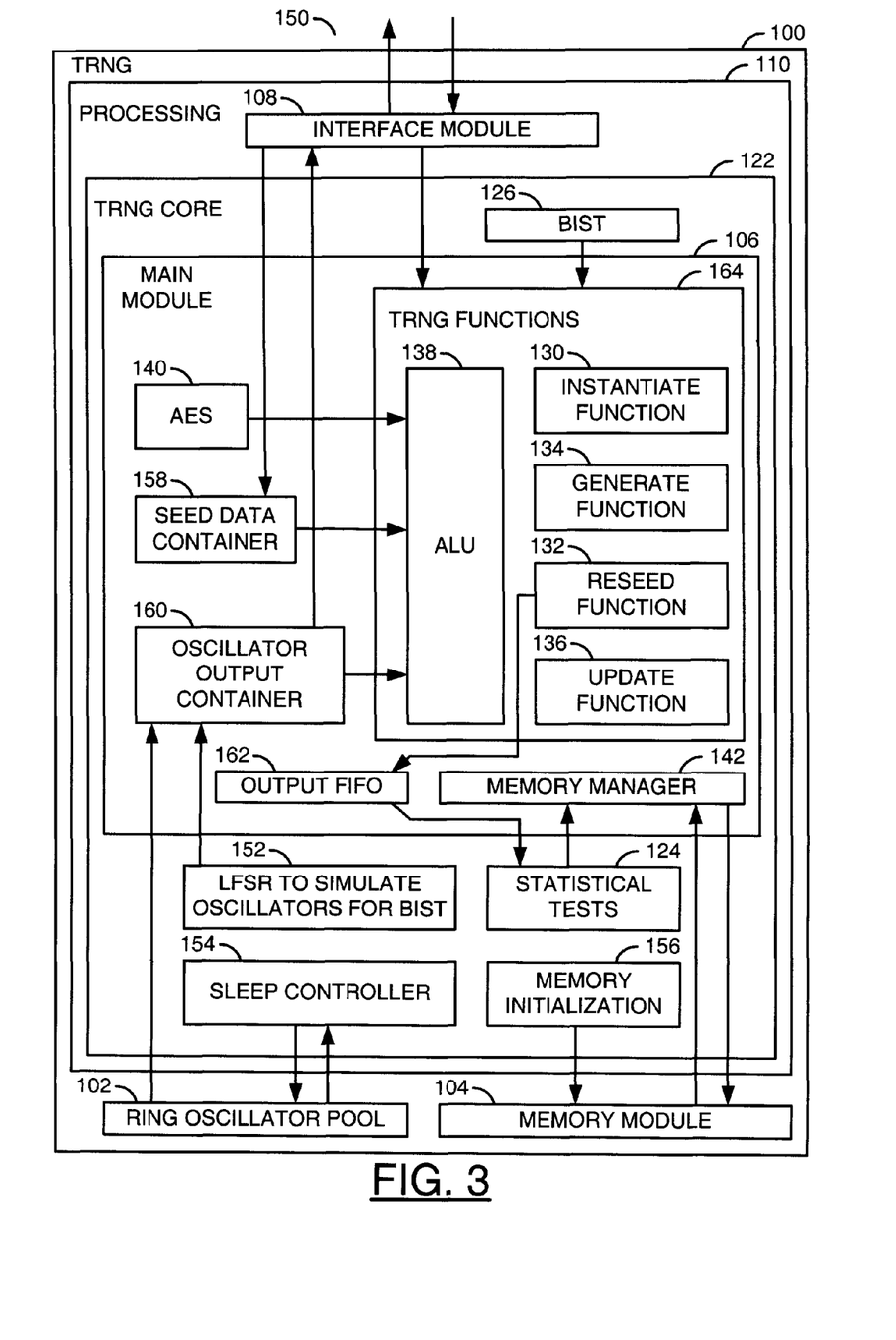
FIG. 3 is a block diagram of an example module hierarchy of the system.

Referring to FIG. 3, a block diagram of an example module hierarchy 150 of the system 100 is shown. The hierarchy 150 generally begins with a top TRNG layer, generally representing the system 100. The TRNG layer generally comprises a processing layer 110, the module 102 and the module 104. The processing layer 110 generally comprises the module 108 and a TRNG Core layer generally represented by the module 122. The TRNG core layer may comprise a main module layer generally represented by the module 106, the module 124, a module 152, a module 154 and a module 156. The main module layer generally comprises the module 140, the module 142, a module 158, a module 160, a module 162 and a module 164. The module 164 generally represents a TRNG function layer. The TRNG function layer generally comprises the modules 130, 132, 134, 136 and 138. The modules 152 to 164 may represent circuits and/or blocks that may be implemented as hardware, software, a combination of hardware and software, or other implementations.

The module 152 may implement a Linear Feedback Shift Register (LFSR) technique. The module 152 may be operational to stimulate the oscillators in the module 102 for BIST purposes. The module 154 may implement a sleep controller. The module 154 is generally operational to control a sleep operation of the module 102. The module 156 may be implemented as an initialization module. The module 156 may be operational to initialize the memory of the module 104.

The module 158 generally implements a seed data container that stores seed data. The seed data may be received by the system via the signal SEEDIN and transferred to the module 158 in the signal SEED. The module 160 may be implemented as an oscillator output container. The module 160 is generally operational to buffer the raw random numbers generated by the module 102 in the signal RNDPOOL. The module 162 generally implements an output FIFO. The module 162 may be operational to buffer the final random numbers to be presented to the module 108 in the signal RND.

Figure 4:
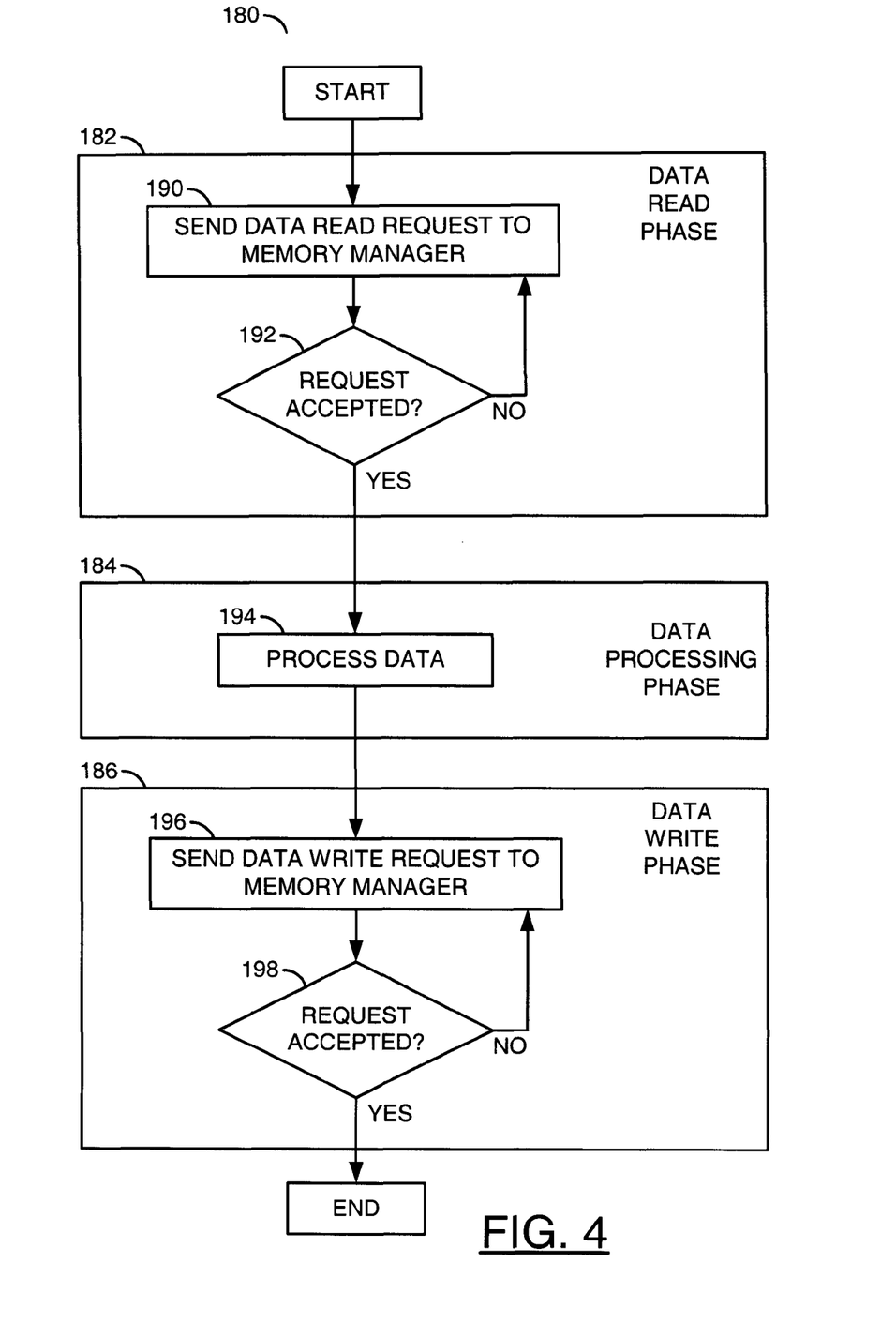
FIG. 4 is a flow diagram of an example implementation of a method of managing resources in the system.

Referring to FIG. 4, a flow diagram of an example implementation of a method 180 of managing resources in the system 100 is shown. The method 180 may be implemented by the system 100. The method 180 generally comprises a step 182, a step 184 and a step 186. The step 182 generally implements a data read phase portion of the method 180. A data processing phase portion of the method 180 may be defined in the step 184. The step 186 generally implements a data write phase portion of the method 180. Each of the steps 182 to 186 may be implemented as a step, a process, a subroutine, a state, a state in a state diagram or another type of step and/or process and/or state.

To optimize an area and a power consumption of the system 100, different TRNG modules and functions generally share the AES resource (e.g., module 140) and the memory (e.g., module 104) resource. Furthermore, some TRNG functions may work in parallel. For example, reading the final random numbers from the module 162 may occur simultaneously with the module 102 generating a next set of raw random numbers. Therefore, the module 142 is generally designed to control access to the various resources of the system 100. Each of the TRNG modules may access the shared resources via the module 142 using the protocol defined by the steps 182, 184 and 186.

The step 182 may implement the data read phase. The step 182 generally comprises a step 190 and a step 192. At the start of the data read phase, a requesting module (e.g., the module 138, the module 140, the module 124, etc.) may send a read data request to the module 142 in the step 190. The read data request may include a target read address where the target data is located in a memory space of the system 100. For example, data generated by the AES process of the module 140 may be mapped to a particular address range in the memory space and thus be available to the other modules through a read data request. The module 142 may evaluate the read data request based on the current availability and scheduling of the resource associated with the target read address. If the module 142 accepts the request (e.g., the YES branch of step 190), the module 142 may assert a special "done" signal back to the requesting module, the requested data may be copied from the target address and subsequently stored in an internal register of the requesting module. Otherwise (e.g., the NO branch of step 190), the requesting module may periodically or aperiodically repeat the read data request until the request is accepted by the module 142. Because the system 100 generally uses a finite-width (e.g., 32-bit) bus for the data exchanges, the data read phase may involve several bus transfers to move all of the requested data.

The step 184 generally implements the data processing phase. The step 184 may comprise one or more steps 194. In the step 184, the values stored in the internal registers of the requesting module may be processed and the results are saved in the output registers of the module. The processing may be performed by the module 138. Other processing resources within the system 100 may be used to perform part or all of the step 194.

The step 186 generally implements the data write phase. The step 186 may comprise a step 196 and a step 198. In the step 196, a requesting module may send a data write request to the module 142. The data write request may include a target write address and the data to be written. In the step 198, the module 142 may evaluate the request based on the availability and scheduling of the resource associated with the write data request. If the request is accepted (e.g., the YES branch of the step 198), the write data may be written at the target write address. If the request is rejected (e.g., the NO branch of step 198), the requesting module may periodically or aperiodically repeat the write data request until accepted by the module 142. A duration of each phase may take more or less time, depending on the internal state of the system 100 and the activity at the module 108. Each of the steps 190 to 198 may be implemented as a step, a process, a subroutine, a state, a state in a state diagram or another type of step and/or process and/or state.

To resolve the data access conflicts, the module 142 generally uses the following priorities from a highest priority 1 to a lowest priority 3:

Priority 1. External interface requests. To provide an immediate response at the external side of the module 108, the TRNG core 122 may processes the external requests (e.g., read generated number, put seed data, start self-test etc.) with the highest priority.

Priority 2. TRNG core functions (e.g., instantiate, reseed, generate, update). Because the TRNG core function are generally the most time-consuming functions, the TRNG core functions may have the second priority level. Each of the second priority functions generally includes several AES encryption steps, so the data requests with the lowest priority may be fulfilled while the module 140 is processing.

Priority 3. Other functions. Saving the raw random numbers generated by the ring oscillators of the module 102 and providing generated numbers to the statistical tests may be performed at the lowest priority.

Figure 5:
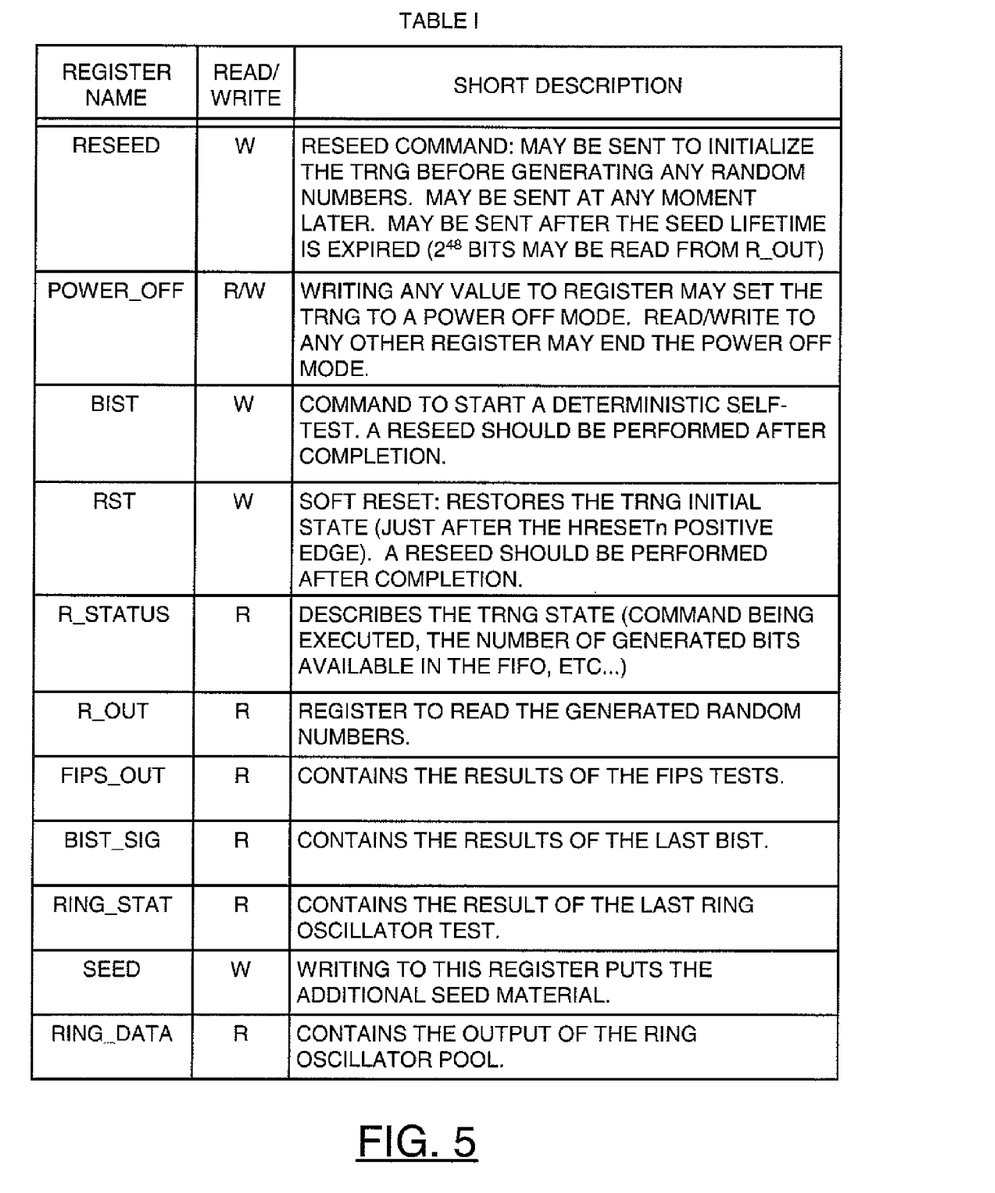
FIG. 5 is a table showing an example implementation of external interface registers of the system.

Referring to FIG. 5, a TABLE I showing an example implementation of external interface registers of the system 100 is shown. The system 100 generally receives commands and seed data at the module 108 in the signal CMDIN and the signal SEEDIN. The system 100 may provide the final generated random numbers and additional information via the signal RNDOUT from the module 108 to other external circuitry and/or software. The module 108 may provide write/read access in the several multi-bit (e.g., 32-bit) registers as shown in TABLE I. Register data may be read out through the signal STATUSOUT.

The system 100 may receive multi-bit words from the external circuitry/software as seed material for a next call of the reseed function 134. All of the received seed words may be concatenated to form a single long seed word. The concatenated seed word may be used as a "nonce" for the function 130 and/or as "optional additional input" for reseeding by the instantiate function 134 (see the NIST Special Publication 800-90 standard, page 18). To support a security strength 256 (generally provided by AES-256 cipher of the module 140), a limited number (e.g., 12) of 32-bit seed words may be utilized as additional seed material. In some embodiments, writing the additional seed material may be optional. Furthermore, the entropy input may be used instead of a nonce (see the NIST Special Publication 800-90 standard page 19, paragraph "8.6.7 Nonce"). Following the NIST, if N (e.g., less than 12) words were received via a seed register (see TABLE I), 12-N words may be added from the output of the ring oscillators of the module 102 to obtain the specified 12 words. During the initialization, the system 100 may fill the module 158 with the oscillators output data, where writing to the seed register may overwrite the data already in the module 158. Since the writing of the raw random numbers from the module 102 into the module 158 may be done at any moment, a counter may be implemented to keep track of the number of written words. When a fixed number (e.g., 12) words are written to the module 158, further words may be ignored. Hence, the reseed function 134 may be called at any time after the initialization the system 100 already has a specified amount of the seed data.

Figure 6:
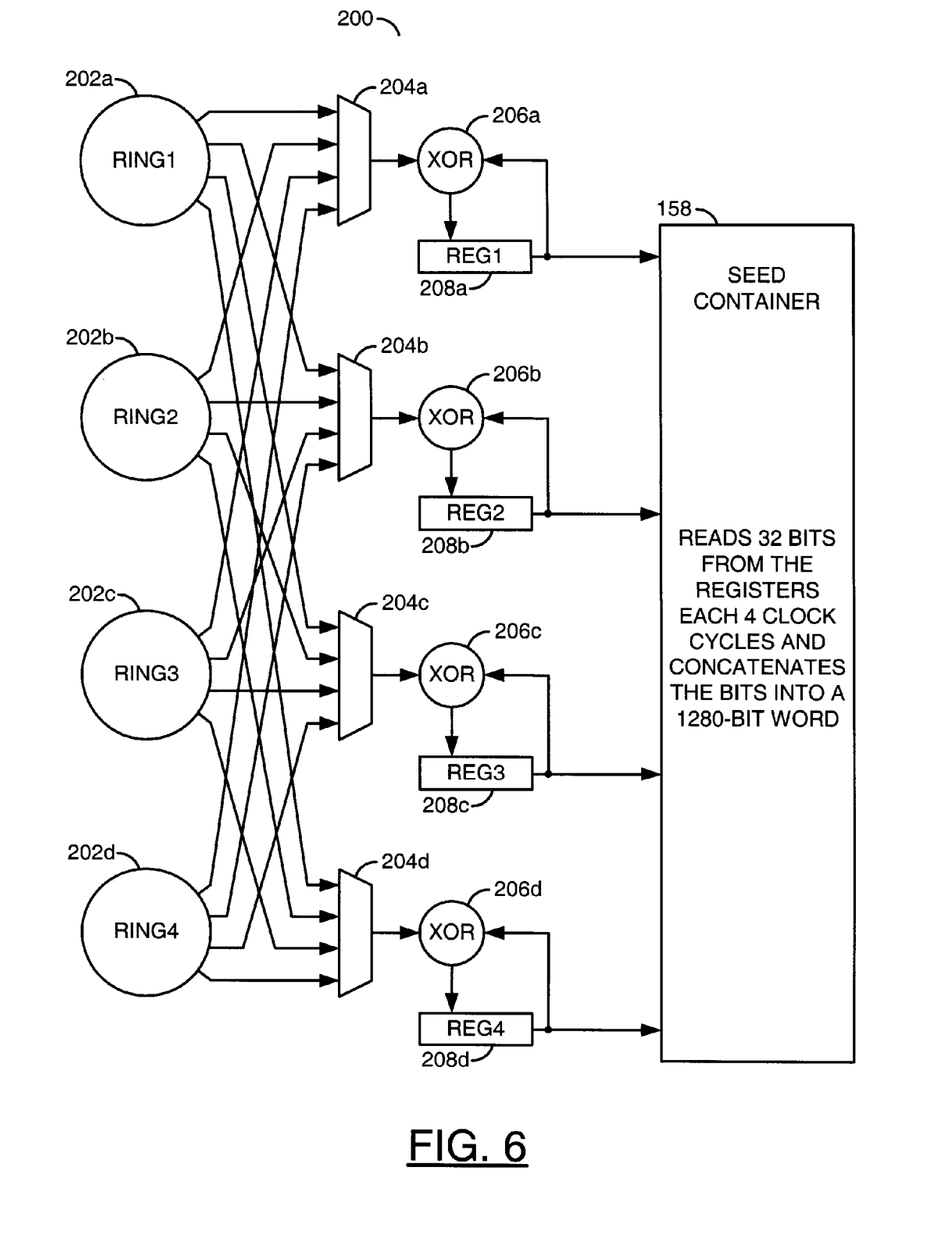
FIG. 6 is a block diagram of an example implementation of a portion of the modules associated with the ring oscillators.

Referring to FIG. 6, a block diagram of an example implementation of a portion 200 of the modules 102 and 106 associated with the ring oscillators are shown. The portion 200 generally comprises multiple modules 202a-202d, multiple multiplexer modules 204a-204d, multiple exclusive-OR (XOR) modules 206a-206d, multiple sampling registers 208a-208d and the module 158. Each of the modules 202a-202d may be implemented as an entropy source. In some embodiments, each of the modules 202a-202d may comprise a ring oscillator. Other entropy sources may be implemented to meet the criteria of a particular application. The modules 202a to 208d may represent circuits and/or blocks that may be implemented as hardware, software, a combination of hardware and software, or other implementations.

Following an IEEE 802.11i-2004 recommendation, the current output numbers of module 202a-202d may XOR-ed in the modules 206a-206d with previous output numbers stored in the registers 208a-208d. The numbers held in the registers 208a-208d may be concatenated to form a large (e.g., 1280-bit) word to obtain the intended entropy. The module 102 generally has several (e.g., 8) groups of the ring oscillators 202a-202d, with multiple (e.g., 4) oscillators in each group. The multiplexers 204a-204d generally mix the outputs signals from all of the ring oscillators 202a-202d in the same group, using a 2-bit counter as a select signal. The IEEE 802.11i-2004 standard, "Part 11: Wireless LAN Medium Access Control (MAC) and Physical Layer (PHY)" specification, 23 Jul. 2004, IEEE New York, N.Y., is hereby incorporated by reference in its entirety.

The ring oscillator pool may embed additional logic to support manufacturing test. For example, each of the ring oscillators 202a-202d may embed multiple (e.g., 2) multiplexers (not shown) that use a special test enable signal as a select. If the test enable signal is asserted (e.g., a logical 1), the multiplexers may break the ring oscillators 202a-202d into multiple (e.g., 2) separate chains of inverters. Each of the separate chains of inverters may be tested separately for both a logical 0 input and a logical 1 input. Furthermore, each of the ring oscillators 202a-202d may be connected to the module 154 (based on the FIPS-140 run test) to detect and avoid a constant output situation.

The system 100 generally uses several (e.g., 4) statistical tests to estimate the randomness of the random numbers. In some embodiments, the statical tests may be a standard set of FIPS tests: monobit test, runs test, long run test, poker test. The FIPS tests may be defined by FIPS Publication 140-2, "Security Requirements for Cryptographic Modules", NIST, 2001, hereby incorporated by reference in its entirety. The FIPS tests may be reliable after around 20,000 bits have been pushed into the module 162. Because the FIFO size in the module 162 is generally limited (e.g., 32 words×32 bits/word), the FIPS tests may collect enough information after the certain number of bits have been taken from the FIFO via an R_OUT register (see TABLE I). The FIPS tests may rely on 20,000 bits and thus may be reliable after 625 (20,000/32) 32-bit words have been pushed into the FIFO.

When the system 100 receives a BIST command via the signal CMD, the following sequence may be performed.
1. Perform a ring oscillator test using the multiplexers to break the rings of inverters as described above.
2. Perform several sleep controller tests by substituting the outputs of the ring oscillators 202a-202d with (i) a sequence constant logical zeros, (ii) a sequence of constant logical ones and (iii) a non-constant sequence having both logical zero and logical ones.
3. Substitute the outputs of the ring oscillators 202a-202d with the output of the module 152.
4. Reinitialize the memory, using the output of the module 152 instead of the output of the ring oscillators 202a-202d, and a predefined sequence as the additional seed data.
5. Execute the reseed function 134, the update function 136 and the generate function 132.
6. Compare the first generated random number with a precalculated correct value and evaluate the BIST results as follows:
   0: OK
   1: the first generated number differs from the correct value
   2: ring oscillator test failed
   3: sleep controller test failed
7. Reconnect the ring oscillators 202a-202d and reinitialize the memory using the output of the ring oscillators 202a. After the BIST is finished, reseeding may be performed.

Some embodiments of the system 100 may include a power saving mode. When the power saving feature is activated, a clock signal, coming to the module 104 and the TRNG core, may be held constant (e.g., a logical 0). In addition, the power saving mode generally commands breaks in the ring oscillators 202a-202d as described above.

The functions performed by the diagrams of FIGS. 1-4 and 6 may be implemented using a conventional general purpose processor, digital computer, microprocessor, microcontroller, RISC (reduced instruction set computer) processor, CISC (complex instruction set computer) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMS), EEPROMs (electronically erasable ROMS), UVPROM (ultra-violet erasable ROMS), Flash memory, magnetic cards, optical cards, and/or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A system comprising:
an entropy module configured to generate a plurality of first random numbers;
a memory device configured to buffer (i) said first random numbers and (ii) a plurality of second random numbers; and
a main module configured to (i) control a first transfer of said first random numbers from said entropy module to said memory device, (ii) control a second transfer of said first random numbers from said memory device to said main module, (iii) generate said second random numbers by encrypting said first random numbers, (iv) control a third transfer of said second random numbers from said main module to said memory device and (v) evaluate a request from a requesting module to perform said third transfer.

2. The system according to claim 1, wherein (i) said main module comprises a processor module and (ii) said main module is configured to control (a) said second transfer of said first random numbers from said memory device to said processor module and (b) said third transfer of said second random number from said processor module to said memory device.

3. The system according to claim 1, wherein said main module is further configured to (i) transfer data from a read address to said requesting module in response to an acceptance of a read request from said requesting module and (ii) ignore said requesting module in response to a rejection of said read request.

4. The system according to claim 1, wherein said main module is further configured to (i) transfer data from said requesting module to a write address in response to an acceptance of a write request from said requesting module and (ii) ignore said requesting module in response to a rejection of said write request.

5. The system according to claim 1, wherein said main module is further configured to generate (a) a read request to obtain said first random numbers from said memory device, (b) a plurality of third random numbers from said first random numbers and (c) a first write request to send said third random numbers to a cipher module.

6. The system according to claim 5, wherein said cipher module is configured to generate a plurality of fourth random numbers by encrypting said third random numbers.

7. The system according to claim 6, wherein said main module is further configured to generate (i) said second random numbers from said fourth random numbers and (ii) a second write request to send said second random numbers to said memory device.

8. The system according to claim 1, wherein said system further comprises a cipher module compliant with an Advanced Encryption Standard (AES)-256 level of security and said system is compliant with a National Institute of Standards and Technology (NIST) 800-90 recommendation.

9. The system according to claim 1, wherein said main module is further configured to control a fourth transfer of said second random numbers from said memory device to an interface module.

10. The system according to claim 1, wherein said requesting module is configured to repeat said request in response to a rejection from said main module.

11. A method of true random number generation, comprising the steps of:
(A) generating a plurality of first random numbers in an entropy module;
(B) controlling a first transfer of said first random numbers from said entropy module to a memory module with a main module;
(C) controlling a second transfer of said first random numbers from said memory module to said main module;
(D) generating a plurality of second random numbers by encrypting said first random numbers in said main module;
(E) controlling a third transfer of said second random numbers from said main module to said memory module; and
(F) evaluating in said main module a request from a requesting module to perform said third transfer.

12. The method according to claim 11, wherein (i) said second transfer of said first random numbers is from said memory module to a processor module of said main module and (ii) said third transfer of said second random number is from said processor module to said memory module.

13. The method according to claim 11, further comprising the steps of:
transferring data from a read address to said requesting module in response to an acceptance of a read request from said requesting module; and
ignoring said requesting module in response to a rejection of said read request.

14. The method according to claim 11, further comprising the steps of:
transferring data from said requesting module to a write address in response to an acceptance of a write request from said requesting module; and
ignoring said requesting module in response to a rejection of said write request.

15. The method according to claim 11, further comprising the steps of:
generating a read request to obtain said first random numbers from said memory module;
generating a plurality of third random numbers from said first random numbers; and
generating a first write request to send said third random numbers to a cipher module.

16. The method according to claim 15, further comprising the step of:
generating a plurality of fourth random numbers by encrypting said third random numbers in said cipher module.

17. The method according to claim 16, further comprising the steps of:
generating said second random numbers from said fourth random numbers; and
generating a second write request to send said second random numbers to said memory module.

18. The method according to claim 11, further comprising the step of:
controlling a fourth transfer of said second random number from said memory module to an interface module.

19. The method according to claim 11, further comprising the step of:
repeating said request from said requesting module in response to said evaluating rejecting said request.

20. A system comprising:
an entropy module configured to generate a plurality of first random numbers;
a memory device configured to buffer (i) said first random numbers and (ii) a plurality of second random numbers; and
a main module configured to (i) control a first transfer of said first random numbers from said entropy module to said memory device, (ii) control a second transfer of said first random numbers from said memory device to said main module, (iii) generate said second random numbers by encrypting said first random numbers, (iv) control a third transfer of said second random numbers from said main module to said memory device, (v) generate a read request to obtain said first random numbers from said memory device, (vi) generate a plurality of third random numbers from said first random numbers and (vii) generate a write request to send said third random numbers to a cipher module.

21. The system according to claim 20, wherein said main module is further configured to evaluate a request from a requesting module to perform said third transfer.

\* \* \* \* \*